United States Patent
Gordon et al.

(10) Patent No.: US 11,000,970 B2
(45) Date of Patent: May 11, 2021

(54) METHOD OF PRODUCING LIMESTONE-SIMULATING CONCRETE

(71) Applicants: Ann P. Gordon, Atmore, AL (US); Donald R. Gordon, Atmore, AL (US)

(72) Inventors: Ann P. Gordon, Atmore, AL (US); Donald R. Gordon, Atmore, AL (US)

(*) Notice: Subject to any disclaimer, the term of this patent is extended or adjusted under 35 U.S.C. 154(b) by 192 days.

(21) Appl. No.: 15/984,839

(22) Filed: May 21, 2018

(65) Prior Publication Data

US 2018/0264682 A1 Sep. 20, 2018

Related U.S. Application Data

(63) Continuation-in-part of application No. 15/010,164, filed on Jan. 29, 2016, now abandoned, which is a
(Continued)

(51) Int. Cl.
*B28B 7/34* (2006.01)
*B28B 1/14* (2006.01)
(Continued)

(52) U.S. Cl.
CPC .............. *B28B 7/38* (2013.01); *B28B 1/14* (2013.01); *B28B 7/007* (2013.01); *B28B 7/342* (2013.01); *C04B 14/06* (2013.01); *C04B 20/0076* (2013.01); *C04B 28/02* (2013.01); *C04B 28/04* (2013.01); *C04B 38/02* (2013.01); *C04B 40/0067* (2013.01); *C04B 40/04* (2013.01); *B28B 2007/005* (2013.01); *C04B 2103/54* (2013.01); *C04B 2111/542* (2013.01)

(58) Field of Classification Search
CPC .. B28B 7/34; B28B 7/342; B28B 7/38; B28B 7/007; B28B 7/06; B28B 7/08; B28B 7/36; B28B 7/344; B28B 7/346; B28B 1/005; B28B 1/14; B44F 9/04
See application file for complete search history.

(56) References Cited

U.S. PATENT DOCUMENTS 5,063,093 A * 11/1991 Mentzer .................. B28B 7/007
428/15
2016/0167251 A1* 6/2016 Gordon ................... C04B 38/02
264/78

OTHER PUBLICATIONS

"Stain or more?". Concrete Countertop Forums; Jun. 2009. <URL: http://concretecountertops.ning.com/forum/topics/stain_or_more>. (Year: 2009).*

(Continued)

*Primary Examiner* — Robert C Dye
(74) *Attorney, Agent, or Firm* — J. Wiley Horton

(57) ABSTRACT

A new process for creating a decorative surface on a cast concrete tile. A mold is prepared by coating with mold release. An aggregate of water, coloring dye, sand, Portland cement, and preferably filler material such as pea gravel is pre-mixed. Baking soda is mixed with a significant volume of water to create a high-viscosity paste. The paste preferably has a high solid to liquid ratio so that it can be crumbled into baking soda clumps of various sizes. The dampened baking soda clumps are sprinkled randomly onto the bottom surface of the mold (which will bear against what becomes the top surface of the cast tile). The pre-mixed aggregate is then added to the mold. Once the aggregate is cured, the cast concrete tile is removed. The baking soda clumps create complex voids in the tile's upper surface, producing a surface texture similar to limestone.

10 Claims, 16 Drawing Sheets

Related U.S. Application Data continuation of application No. 12/660,559, filed on Mar. 1, 2010, now abandoned.

(51) Int. Cl.
    *B28B 7/38*     (2006.01)
    *C04B 14/06*     (2006.01)
    *C04B 28/04*     (2006.01)
    *C04B 38/02*     (2006.01)
    *C04B 40/00*     (2006.01)
    *C04B 40/04*     (2006.01)
    *C04B 20/00*     (2006.01)
    *C04B 28/02*     (2006.01)
    *B28B 7/00*     (2006.01)
    *C04B 111/54*     (2006.01)
    *C04B 103/54*     (2006.01)

(56) References Cited

OTHER PUBLICATIONS

"Pressed Look." Concrete Countertop Forums; Sep. 2009. <URL: http://concretecountertops.ning.com/forum/topics/pressed-look>. (Year: 2009).*

* cited by examiner

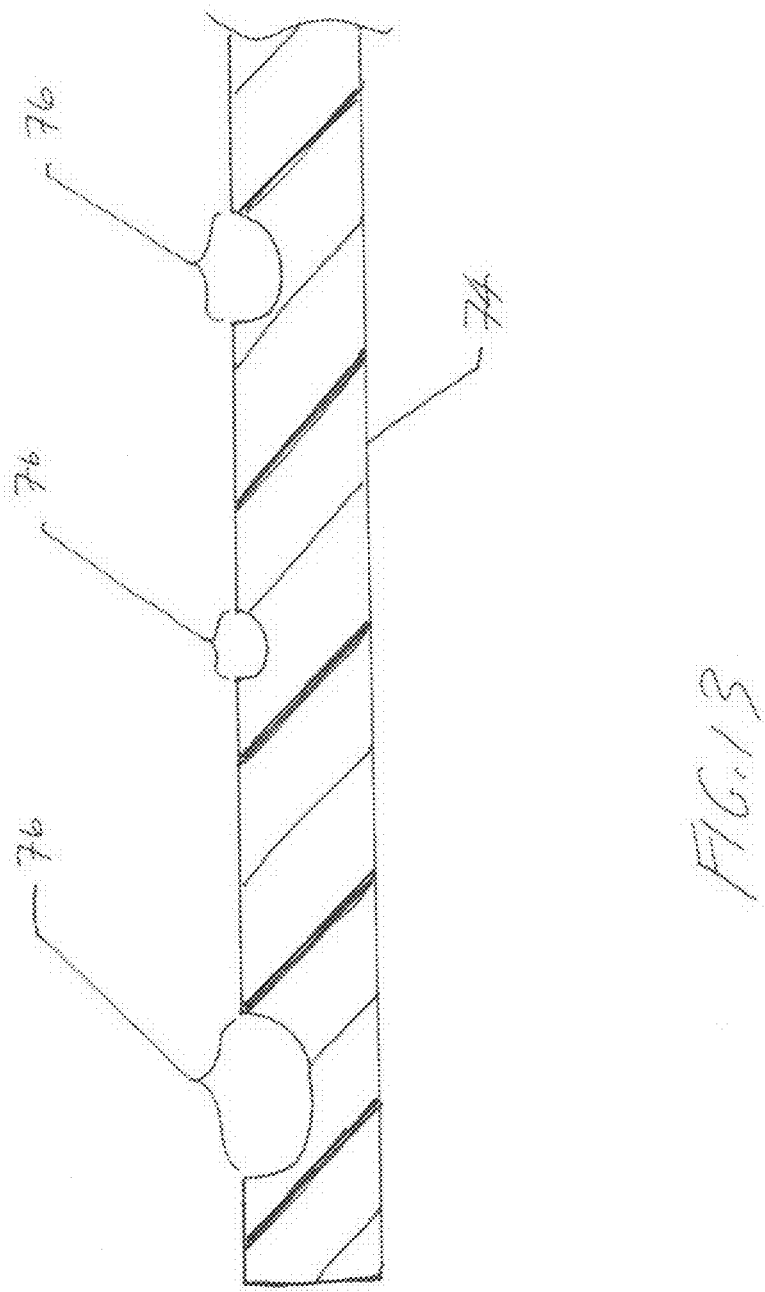

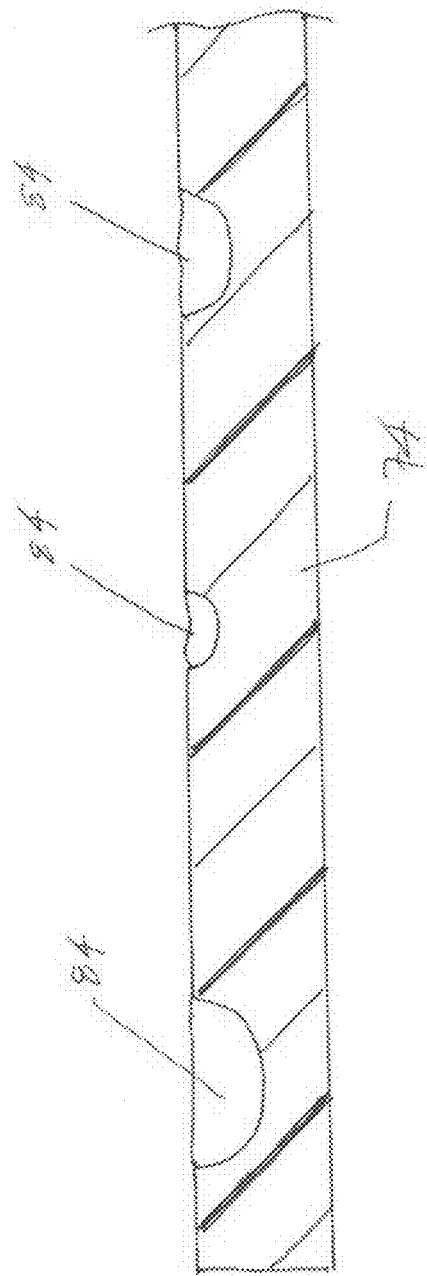

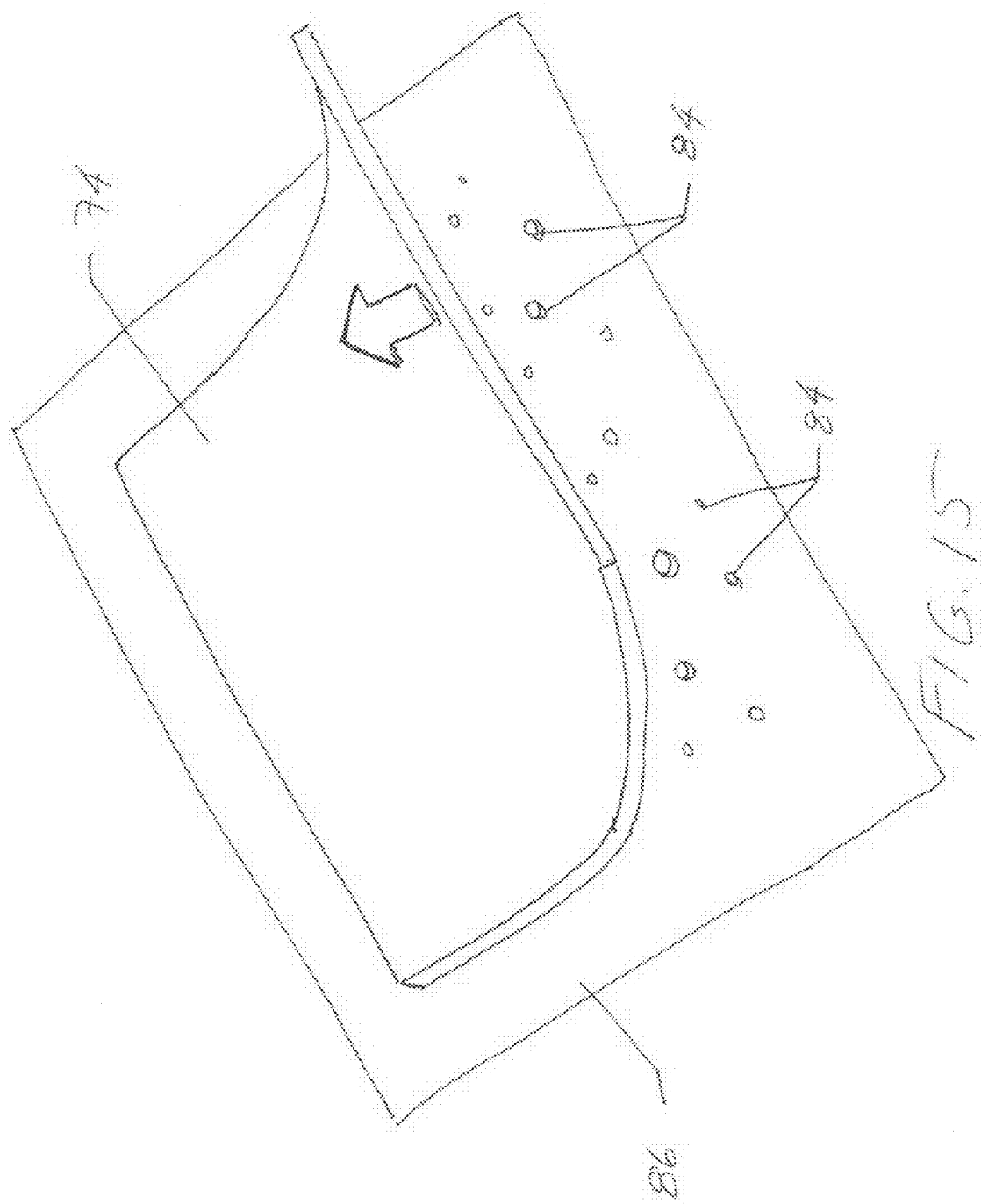

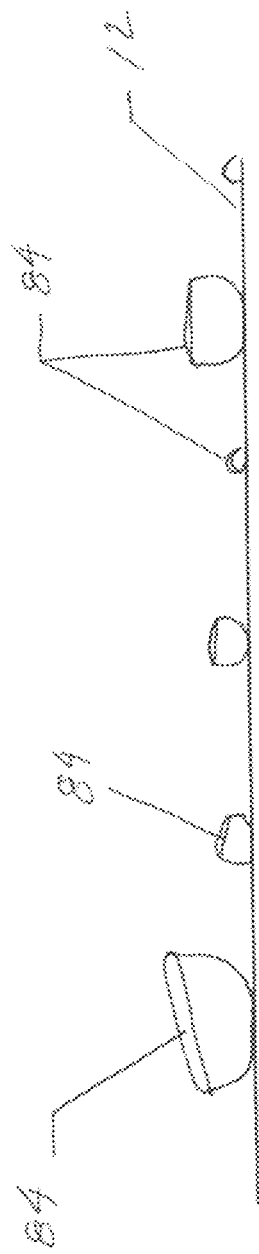

METHOD OF PRODUCING LIMESTONE-SIMULATING CONCRETE

CROSS-REFERENCES TO RELATED APPLICATIONS

This application is a continuation-in-part of prior patent application Ser. No. 15/010,164. The parent application was filed on Jan. 29, 2016. It listed the same inventors.

BACKGROUND OF THE INVENTION

1. Field of the Invention

This invention relates to the field of building materials. More specifically, the invention comprises a method for producing a simulated limestone finish on the surface of cast concrete tiles.

2. Description of the Related Art

Concrete has been used to cast functional and decorative building materials tor many years. It may be used, as an example, to pour a monolithic floor slab. A finished surface can be created on such a slab, so that no further flooring material is needed.

Concrete is long-lasting and relatively inexpensive. One drawback, however, is its perceived lack of visual appeal. While some recent innovations in decorative surfaces have improved the appeal of concrete, it docs not rival natural stone. Stone pavers or tiles display a natural variation in texture, luster, and color which many people find appealing. Stone pavers also feature cavities of varying depths with complex surface textures. For these reasons, most people prefer the look of natural stone. However, the price of stone—which can be ten times more expensive than concrete—often drives the consumer toward concrete. It would therefore be advantageous to provide a cast concrete product which mimics the desired surface look of natural stone.

BRIEF SUMMARY OF THE INVENTION

The present invention comprises a new process for creating a decorative surface on a cast concrete tile. A mold is prepared by coating with mold release. An aggregate of water, coloring dye, sand, Portland cement, and pea gravel is pre-mixed. Baking soda is mixed with a significant volume of water to create a high-viscosity paste. The paste preferably has a high solid to liquid ratio so that it can be crumbled or molded into baking soda clumps of various sizes. The dampened baking soda clumps are sprinkled randomly onto the bottom surface of the mold (which will bear against what becomes the top surface of the cast tile). The pre-mixed aggregate is then added to the mold. The aggregate is then screed and compressed in the mold to minimize voids. A plastic cover is next added to reduce the moisture loss rate and increase the curing time.

The wet aggregate comes into contact with the hacking soda clumps. The baking soda reacts with the water in the aggregate to form sodium hydroxide and carbonic acid. A portion of the carbonic acid then tends to break down into water and carbon dioxide gas. The carbon dioxide gas produces voids and channels around the baking soda clumps as the aggregate cures.

Once the aggregate is cured, the mold is separated into its component pieces and the cast concrete tile is removed. The residual baking soda is preferably removed. The upper surface of the cast tile will have been etched by the dampened baking soda, producing a variation in color and texture. The size of the baking soda clumps will also produce significant cavities in the surface. The production of the carbon dioxide gas provides a complex texture to the surface of these cavities. The ultimate effect is similar to natural stone.

BRIEF DESCRIPTION OF THE SEVERAL VIEWS OF THE DRAWINGS

FIG. 13 is a sectional elevation view, showing the cavities in more detail.

FIG. 14 is a sectional elevation view, showing the cavities of FIG. 13 after they have been filled with paste.

FIG. 15 is a perspective view, showing the emptying of the mold.

FIG. 16 is an elevation view, showing some molded paste clumps.

Figure 1:
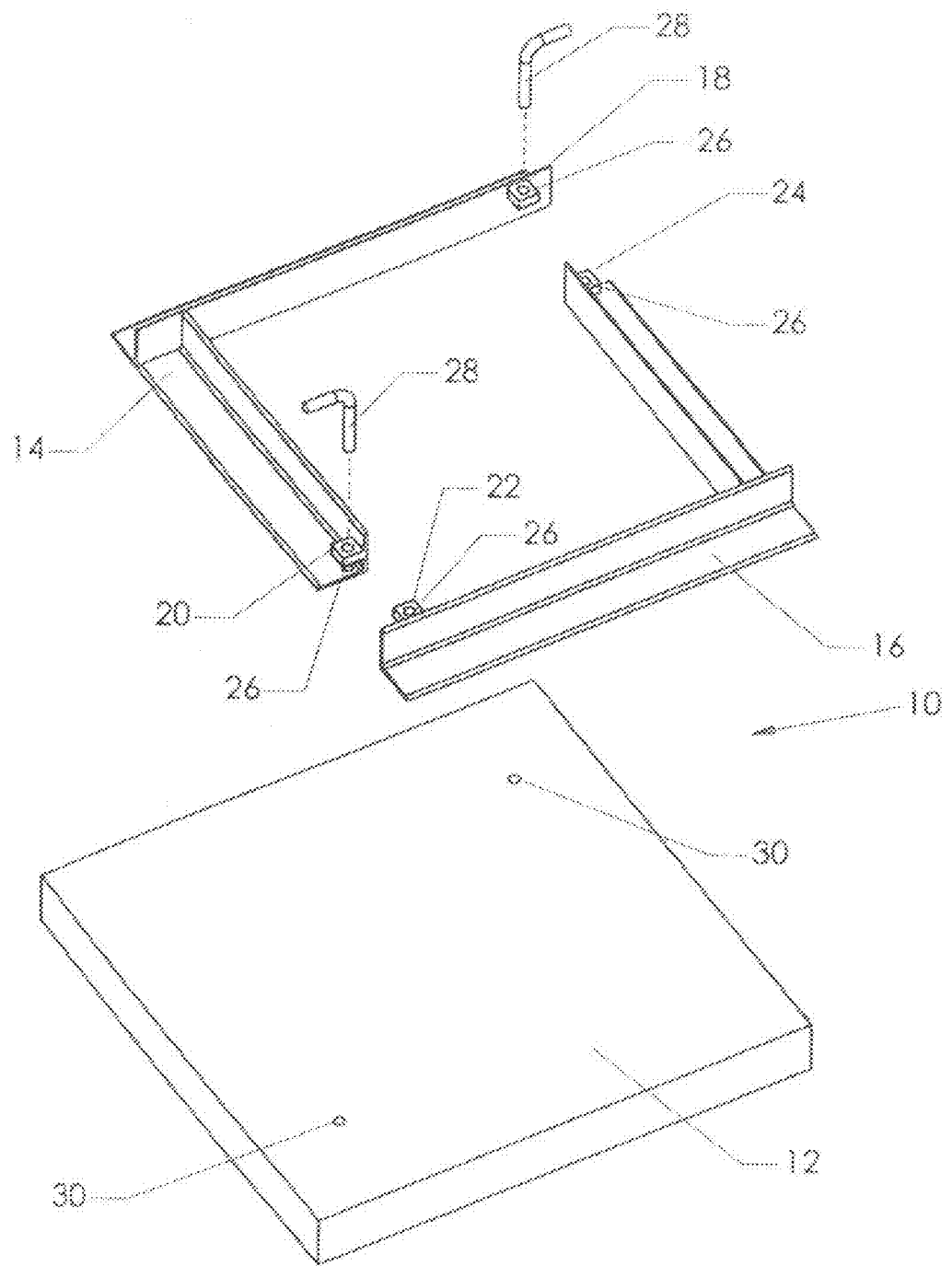
FIG. 1 is a perspective view, showing a mold used to create a cast tile.

REFERENCE NUMERALS IN THE DRAWINGS 10 mold
12 base
14 half frame
16 half frame
18 upper tab
20 lower tab
22 upper tab
24 lower tab
26 hole
28 pin
30 pin hole
32 mold cavity
34 baking soda
36 aggregate
38 shovel
40 filled mold
42 completed tile
44 void
46 color variation 48 back side
50 mixing container
52 water
54 mixer
56 water infused baking soda
58 soda clump
60 wet concrete
62 carbon dioxide bubble
64 large cavity
66 bubble cavity
68 bubble channel
70 dry concrete
72 textured surface
74 flexible mold
76 cavity
78 upper surface
80 paste
82 squeegee
84 molded paste dump
86 sheet

DETAILED DESCRIPTION OF THE INVENTION

FIG. 1 shows the components of the mold used to create a cast tile. The mold is created by joining half frame 14 and half frame 16 to base 12. Half frame 14 and half frame 16 are both "L" shaped pieces that form a square when joined at their ends. Half frame 14 has upper tab 18 that mates with lower tab 24 of half frame 16 when the two half frames are joined to form a square. Half frame 14 also has lower tab 20 that mates with upper tab 22 of half frame 16 when the square-framed mold is formed. Corresponding holes 26 of upper tab 18 and lower tab 24 and corresponding holes 26 of upper tab 22 and lower tab 20 align when the two frames are joined and the upper and lower tabs are mated.

Base 12 has two pin holes 30 which are adapted to receive pins 28 when tire frame is placed on the base. As described above, corresponding holes 26 of upper tab 18 and lower tab 24 and corresponding holes 26 of upper tab 22 and lower tab 20 are aligned when half frame 14 and half frame 16 are joined to form a square. Pins 28 are then inserted through holes 26 and pin holes 30 in base 12.

Figure 2:
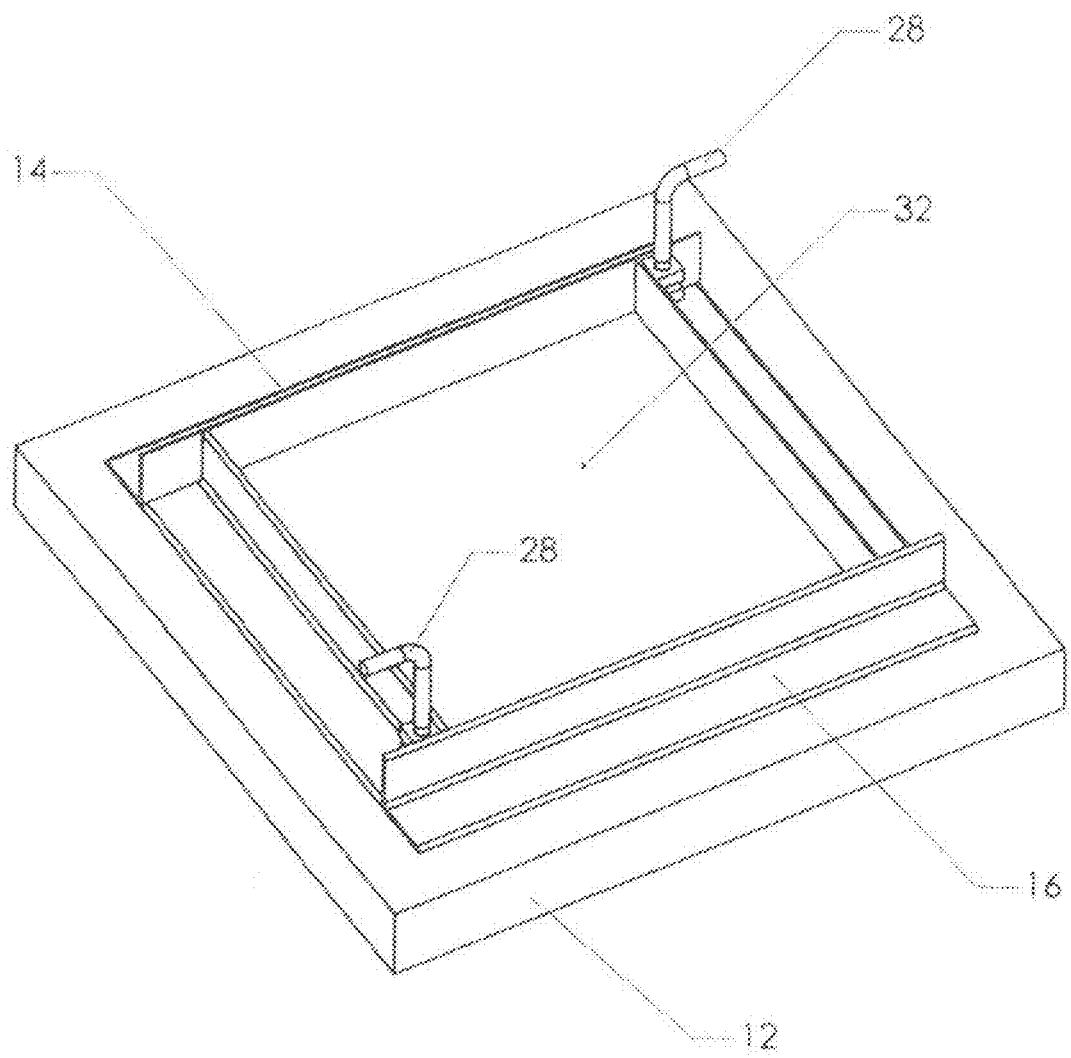
FIG. 2 is a perspective view, showing the mold in an assembled state.

The assembled mold is illustrated in FIG. 2. Half frame 14 and half frame 16 form a square that is connected together and to base 12 by pins 28 as described above. Mold cavity 32 results from the attachment of the two half frames to the base.

Figure 3:
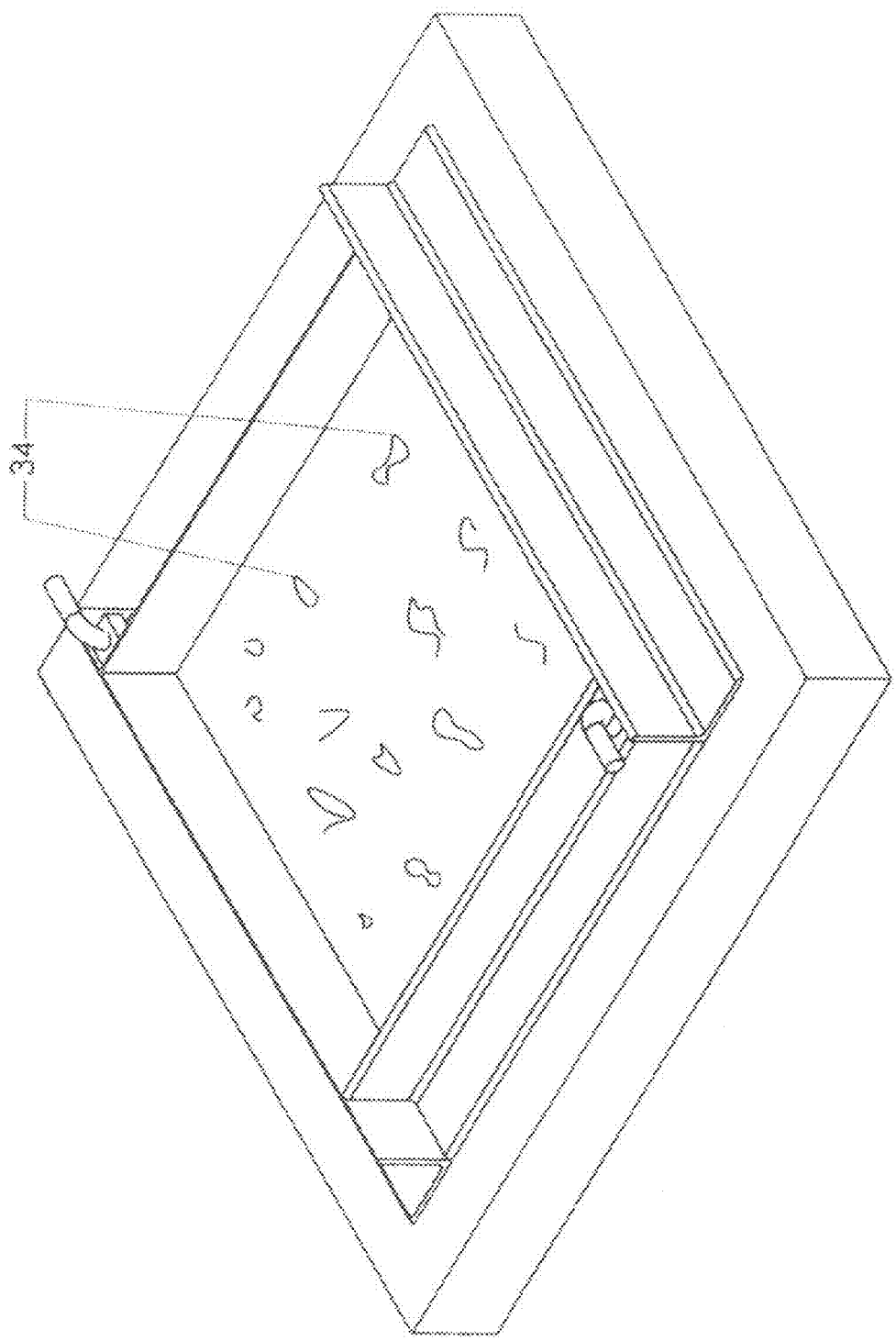
FIG. 3 is a perspective view, showing the addition of the dampened baking soda.

FIG. 3 shows how the mold is prepared to produce concrete tiles with a stone-like appearance. The surfaces of the mold are first prepared with mold release to prevent bondage of the concrete to the mold. Those skilled in the art are familiar with this part of the process and the various products that can be used to prevent bondage. Baking soda 34, sodium bicarbonate, is next applied to the base 12. The baking soda must be prepared in a controlled fashion.

Figure 7:
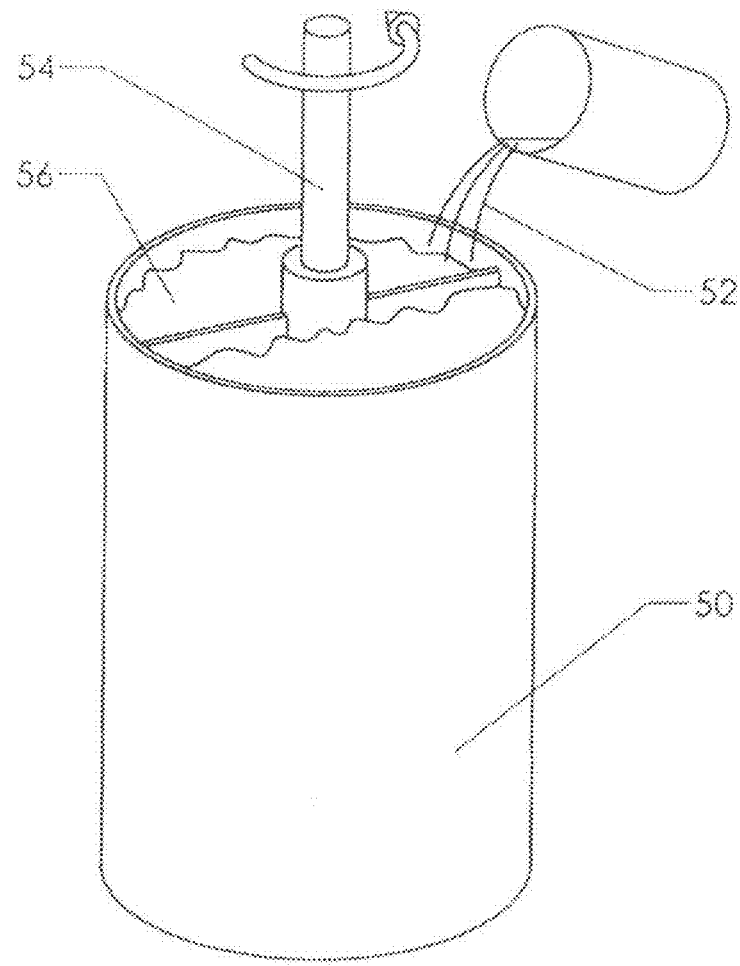
FIG. 7 is a perspective view, showing the process of adding water to the baking soda to form a high viscosity paste.

FIG. 7 shows one method of preparing the baking soda. The baking soda is placed in mixing container 50. Water 52 is added while mixer rotates within the mixing container to mix the water into the baking soda. The mixing continues until the water is completely infused through the baking soda. Sufficient water should be added to produce a high-viscosity paste which can then be mechanically broken into clumps of a desired size. The baking soda to water ratio is significant. The table presented below describes the performance of various mixtures of baking soda and water, with the ratios being stated in terms of volume.

TABLE ONE

| Baking Soda to Water Ratio | Result |
| --- | --- |
| 5.00 to 1 | Clumps are 0.5 mm to 2.0 mm |
| 4.75 to 1 | Clumps are 1.0 mm to 10.0 mm (avg. 5.0 mm) |
| 4.50 to 1 | Clumps are 2.0 mm to 13.0 mm (avg. 6.0 mm) |
| 4.25 to 1 | Clumps are 4.0 mm to 24.0 mm (avg. 12.0 mm) |
| 3.75 to 1 | Clumps are 25.0 mm+ |
| 2.50 to 1 | Forms a slurry that will not crumble |

The particle size of the unwetted baking soda is quite small—well under 0.2 mm. The creation of the high viscosity paste allows the baking soda to be aggregated into much larger clumps. The clumps are created by mechanically shearing the water infused baking soda to break it into clumps. The shearing may be performed manually, or by using a mechanical shearing device. One skilled in the production process may create a suitable collection of clumps by kneading the paste using his or her hands. The sheared clumps will simply fall out of the hands where they may be collected.

The size of the clumps used is significant. The reader may need an initial understanding of how the clumps are used to appreciate the significance of the clump size. A brief explanation of use will thus be provided at this time, with a more detailed explanation to follow.

The water infused baking soda clumps are spread onto the lower surface of the concrete mold. Wet aggregate is then placed in the mold and left to cure. The baking soda clumps perform three basic functions: (1) They create large cavities in what will become the upper surface of the decorative tile; (2) The baking soda forms bubbles which displace some concrete and create a deeply textured surface in the large cavities; and (3) A small portion of the baking soda dissolves in water and flows away from the clumps over what will become the upper surface—thereby providing a conventional etching effect.

The goal is to mimic natural stone. Thus, baking soda clumps below about 2.0 mm in size are not very useful because they will not create cavities in the finished product that are large enough for an observer to see and appreciate. Adding more water to the baking soda paste tends to permit the creation of larger clumps. However, adding more water also creates a clump which tends to slump and flatten when the concrete is added to the mold. Experimentation has shown that a usable range of baking soda to water ratio (stated in terms of volume) is between about 5 to 1 and about 4 to 1. A more preferable range is between about 4.75 to 1 and about 4.25 to 1. The most preferred range is around 4.50 to 1. This ratio produces a good clump size and a nice variation in clump size. The clumps produced are fairly rigid and able to hold their shape when the wet concrete is added—thereby creating a large and fairly deep void in the finished surface.

The exact baking soda to water ratio will depend somewhat upon the ambient temperature and humidity (as well as how long the baking soda has been exposed to ambient humidity). Thus, in humid conditions the ideal volumetric ratio could be 4.60 to 1, while in dry conditions it might drop to 4.40 to 1. Some adjustment may be needed to maintain the desired distribution of baking soda clump sizes—which is the ultimate objective.

It is known in the art to spread fine baking soda powder over wet concrete to etch the surface. A typical particle size distribution of baking soda is 0.001 to 0.004 mm in diameter. These small particles simply dissolve in the water and create the etching effects via reacting with the water, calcium compounds, and silicon compounds in the concrete aggregate. They are too small to create voids or other visually discernible surface features. The baking soda clumps used in the present inventive process must be a substantial size in order to create the desired voids and other visual effects. As explained previously, this means that most of the clumps need to be 2.0 mm or larger.

Figure 8:
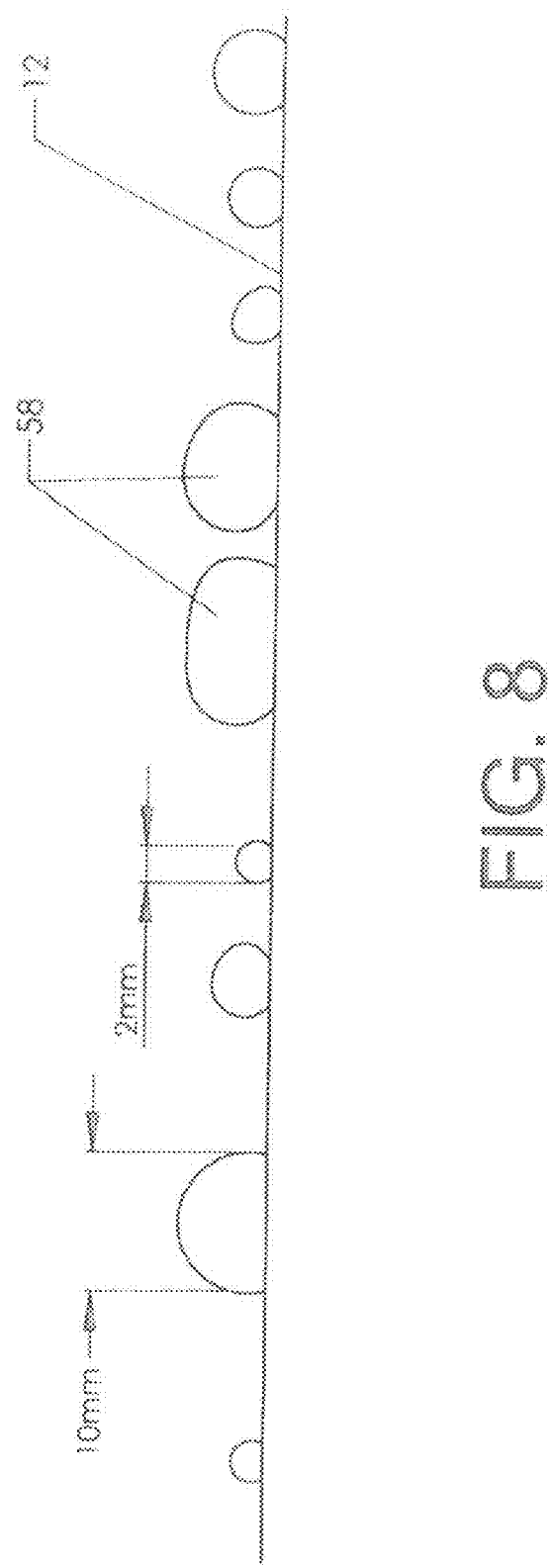
FIG. 8 is an elevation view, showing the baking soda clumps on the bottom surface of the mold.

Those skilled in the art will realize that the water infused baking soda can be mixed and crumbled using a wide variety of techniques. However this is done, the baking soda clumps thus produced are randomly spread across the surface of the base of the mold. FIG. 8 shows a variety of soda clumps 58 resting on base 12. Some of the clomps are fairly small (2 mm) while others are fairly large (10 mm) with a broad distribution of intermediate sizes.

Concrete aggregate must then be made to produce the tiles. The aggregate can be any combination of concrete sand, gravel, cement, coloring agent and water. Those skilled in the an know that the precise formula can be varied to produce concrete with different appearances and properties. The aggregate is formed by mixing the aforementioned ingredients in a mixer. Additionally, the use of an ochre coloring agent is especially effective in creating stone-like coloration. A heterogeneous coloration of the mixture can be enhanced by mixing the ingredients tor three to five minutes, i.e., the coloring dye is unevenly distributed.

Figure 4:
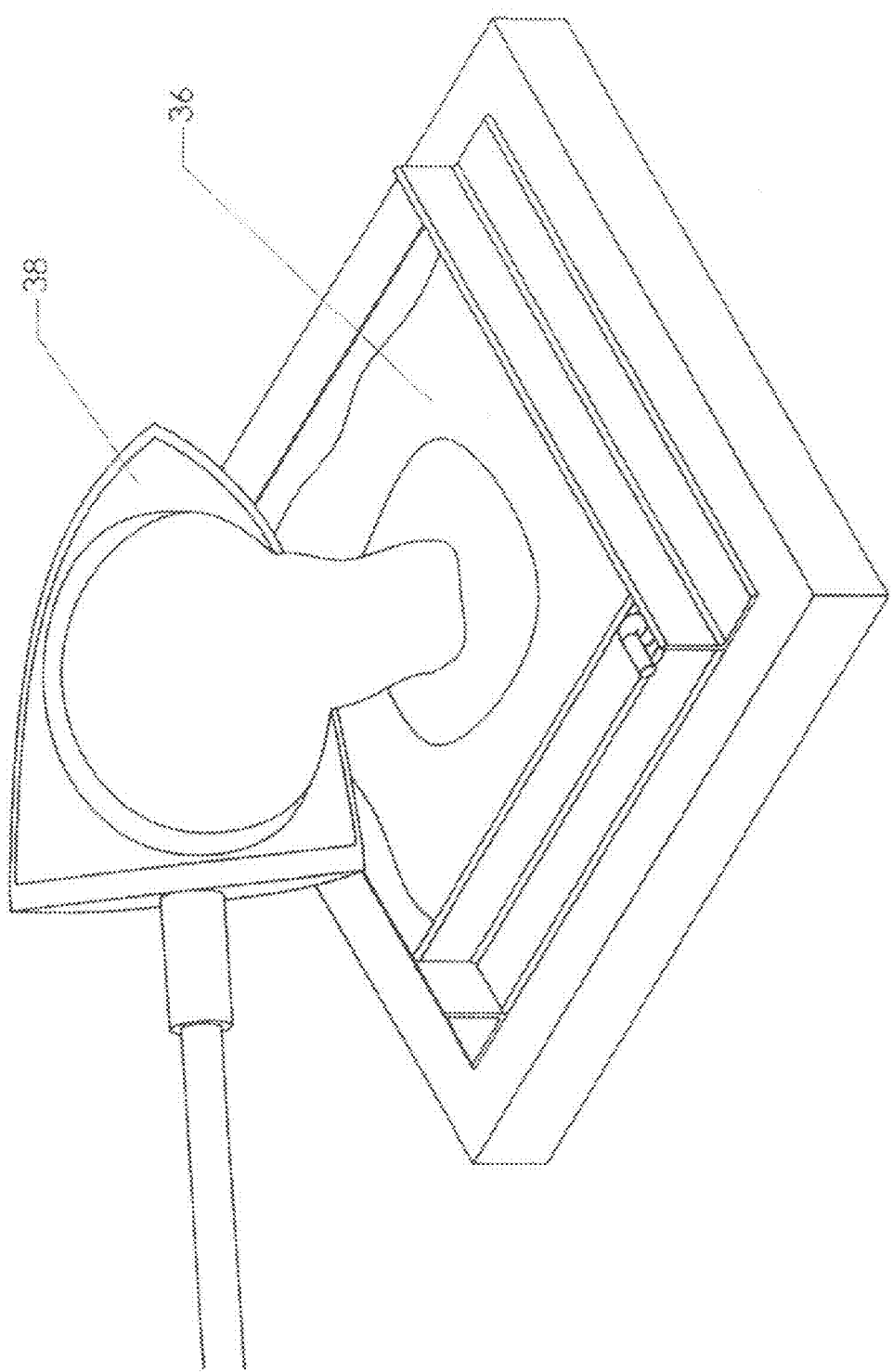
FIG. 4 is a perspective view, showing the filling of the mold.

The mold is then filled as shown in FIG. 4. The mold cavity is filled with aggregate 36 using shovel 38 or a variety of other known techniques. The mold cavity is filled completely with special care given to insure that the corners of the mold are filled and that the aggregate surface is even and level with the mold frame. A screed bar can be raked back and forth across the top of the mold frame to prevent the formation of ridges, lumps, or raised corners.

Figure 5:
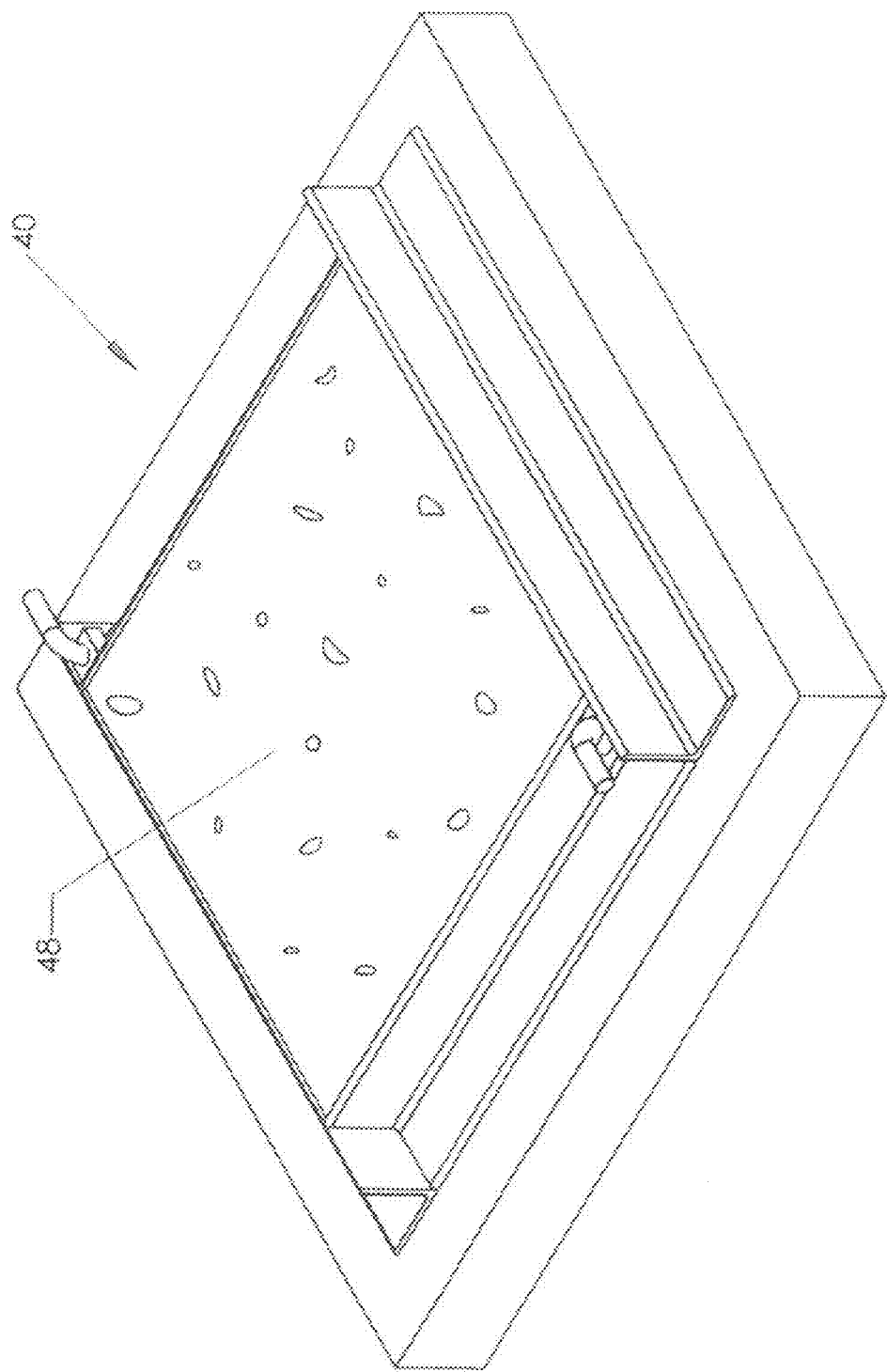
FIG. 5 is a perspective view, showing the concrete curing in the mold.

The aggregate is then allowed to cure as shown in FIG. 5. Filled mold 40 is allowed to sit long enough for the aggregate to dry. Those skilled in the art know that the drying time required is dependent upon the aggregate's recipe and environmental conditions like temperature and humidity. The tiles can be covered with plastic wrap during the curing process to help the tiles hold in moisture.

Figure 9:
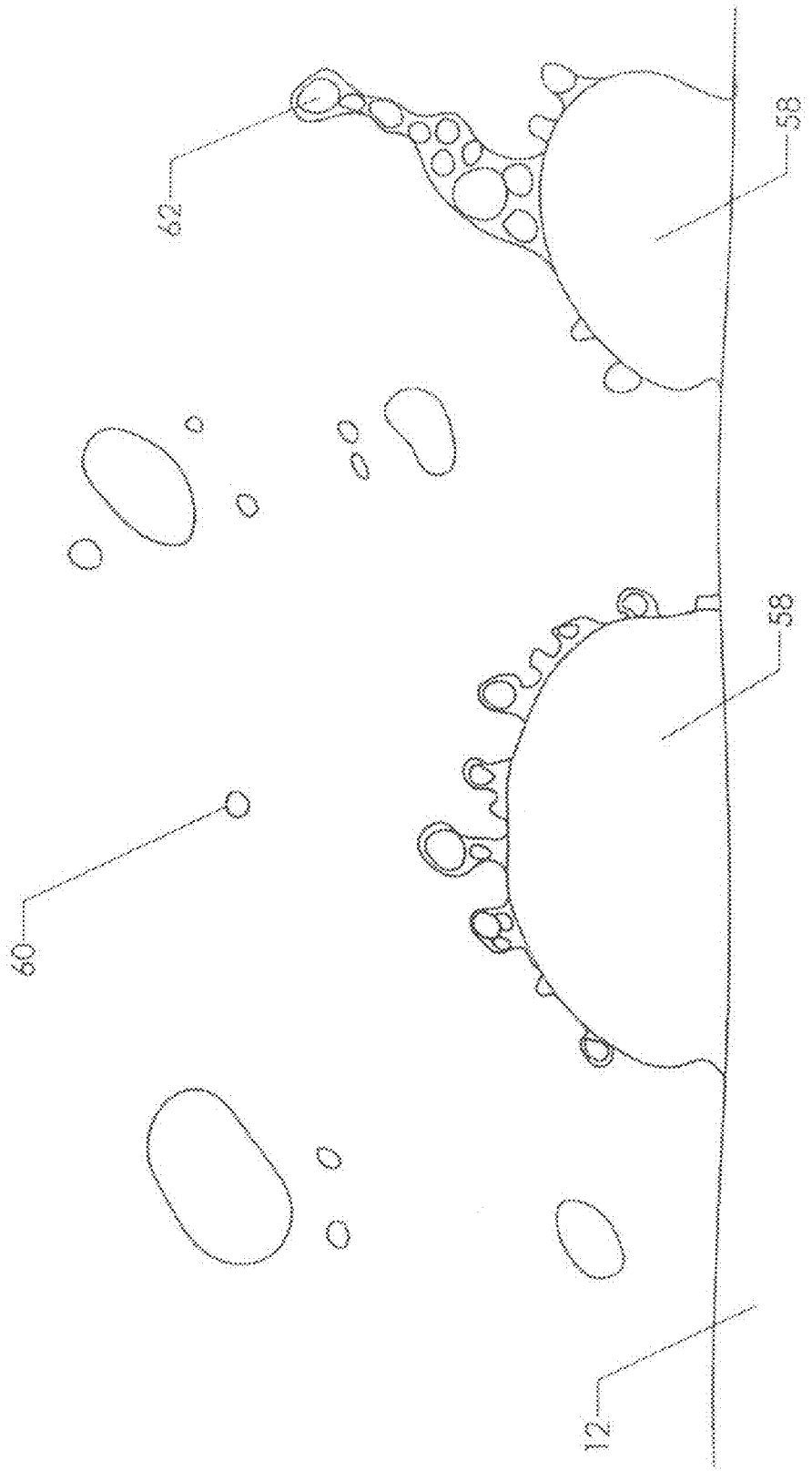
FIG. 9 is a sectional elevation view, showing the reaction between the baking soda clump and the surrounding wet concrete.

FIG. 9 shows a sectional elevation view through the soda clumps as the concrete aggregate is curing. Wet concrete 60 surrounds and envelopes soda clumps 58. The baking soda (sodium bicarbonate) mildly reacts with the water in the surrounding concrete (as well as with the water within the clump) as expressed in the following reaction:

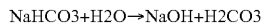

$NaHCO_3 + H_2O \rightarrow NaOH + H_2CO_3$

Some of the carbonic acid then breaks down as expressed in the following reaction;

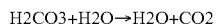

$H_2CO_3 + H_2O \rightarrow H_2O + CO_2$

The reaction thus gives off a small quantity of carbon dioxide gas in the vicinity of the surface of the soda clumps. This is a mild reaction and not to be confused with the relatively violent reaction created when baking soda is mixed with an acidic substance such as citric acid or vinegar. The concrete aggregate is fairly alkaline and the gas formation rate is limited. A moderate quantity of carbon dioxide bubbles 62 forms in the water surrounding the soda clumps. Some bubbles are small while others grow larger. Some bubbles aggregate and form channels in the wet concrete 60 (as seen in the right hand soda clump 58 shown in FIG. 9).

Those skilled in the art will know that the alkalinity of the concrete aggregate can be adjusted by adjusting the ratio of Portland cement to the other materials, as well as by adding modifiers such as weak acids. Adjusting the alkalinity will alter the carbon dioxide gas formation rale around the baking soda clumps. This will alter the amount of surface texture added by the gas bubbles to the voids created by the soda clumps. As explained in the present inventive method, the size of the baking soda clumps can be adjusted by varying the water content of the high-viscosity baking soda paste. Varying the clump size will vary the overall size of the voids in the finished surface produced by the clumps. Thus, one practicing the inventive process has the ability to vary the size of the voids and the surface texture of the voids. This permits many different types of stone to be accurately simulated.

A small portion of the baking soda tends to dissolve in the surrounding water and spread as a film across base 12. This portion acts like the prior art technique of spreading dry powdered baking soda across a concrete mold. It mildly etches the surface and produces pleasing color variations.

Those skilled in the art will know that humidity and temperature control can be added to the curing process to produce a more evenly cured product. Once cured, the tile is released from the mold by removing the pins and tapping the frame with a hammer.

Figure 6:
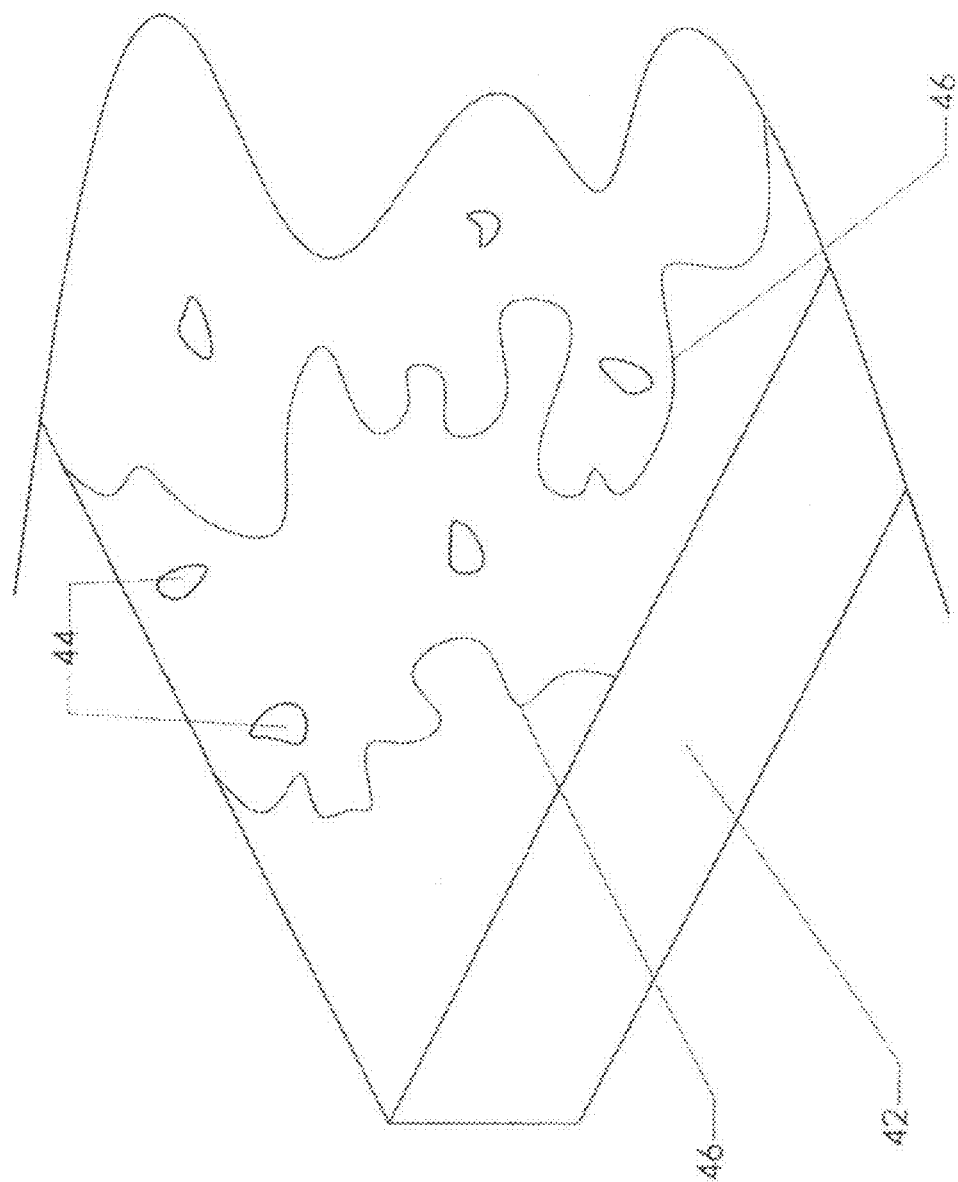
FIG. 6 is a detail view, showing the surface finish of a cast tile.

The resulting tile that is produced by this process is shown in FIG. 6. Completed tile 42 serves as an illustration of some of the features and added benefits of this process. First, voids 44 are created where the aggregate cures around the space occupied by the baking soda and gases produced by the reaction of baking soda with the aggregate. This gives the surface of the tile a porous texture that is a similar to the surface of tiles made from natural stone. Additionally, color variation 46 is produced. The lines illustrated in FIG. 6 represent the boundary between subtly different hues. This boundary may actually appear blurry or mottled. Color variation is also influenced by the reaction of the baking soda and aggregate. This variation in color is often desirable as it mimics the coloration of natural stone.

Figure 10:
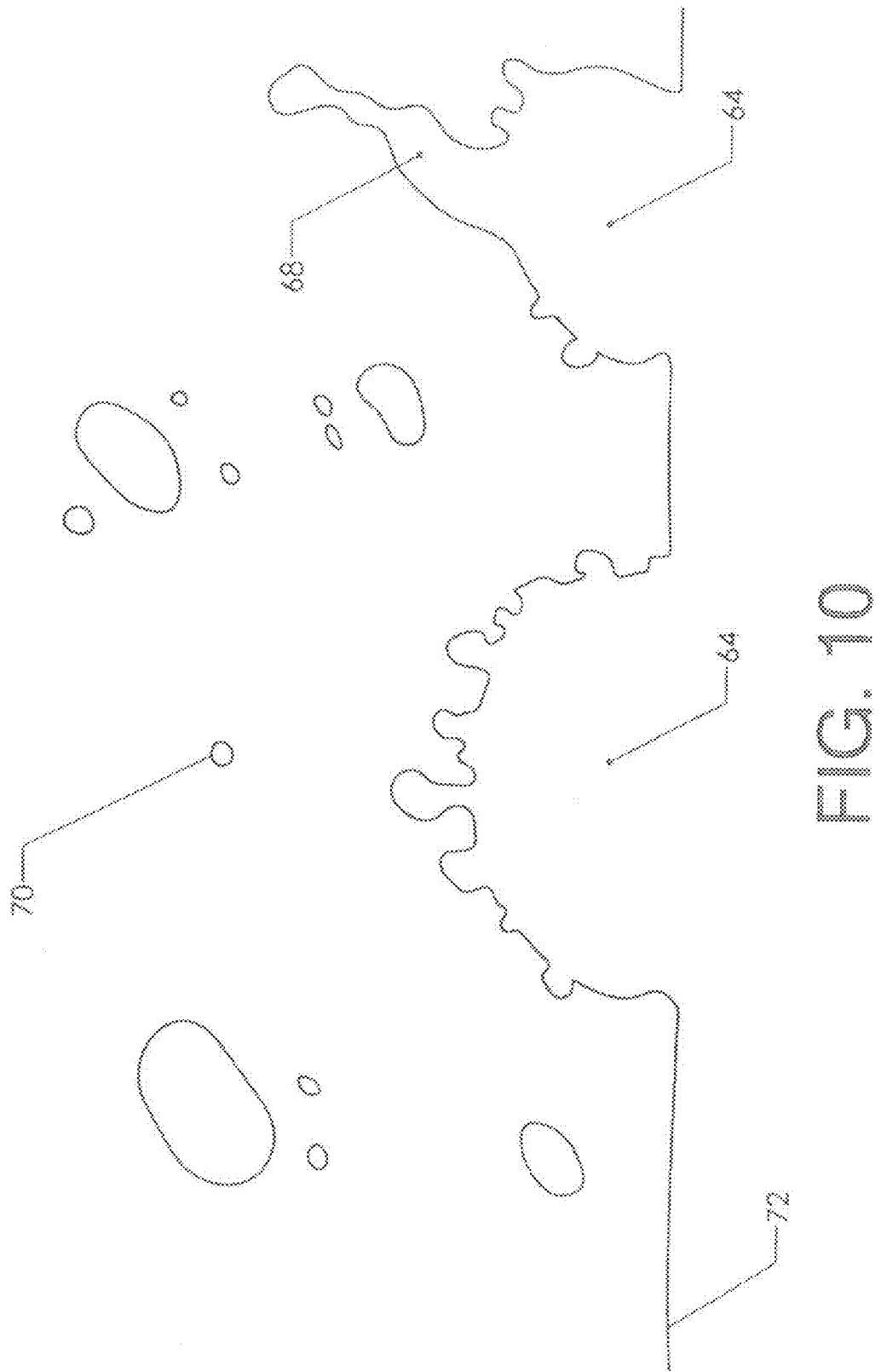
FIG. 10 is a sectional elevation view, showing the surface of the concrete after it has cured.

FIG. 10 shows the textured surface in much more detail. The reader should note that the resulting texture of FIG. 10 corresponds to the soda clumps illustrated in FIG. 9. The soda clumps produce large and richly textured voids. Textured surface 72 includes large cavities 64 created by the baking soda clumps. Many smaller bubble cavities 66 lie along the boundary of each large cavity—producing a texture reminiscent of coral. Bubble channels 68 extending deep into the dried concrete are also formed at various locations. The reader should appreciate that the depiction in FIG. 10 is two dimensional. The effect is in reality three dimensional with a great deal of pleasing complexity. The result is very similar (visually) to the appearance of natural stone.

Different coloring agents can be used to mimic many varieties of natural stone colors. 548 Ochre color, an effective coloring agent for producing a natural stone look, is commercially available from the New Riverside Ochre Company located in Cartersville, Ga. Other coloring agents can be used to imitate other naturally occurring stone colorations including dolphin grey, champagne, and rice white. Multiple coloring agents can even be used in the same batch to produce tiles with swirls of different colors. Furthermore, the degree of color variation can be controlled by adjusting the mixing time of the aggregate. A longer mixing time will result in a more homogenous coloration, and a shorter mixing time will result in greater color variation across the tile's surface.

The process can be automated as well. One example of an automated process utilizes multi-cavity automated machinery to produce the tiles with limited human assistance. An automated mixer can be used to prepare the aggregate, and a controller can be used to coordinate mixing and pouring time intervals. An automated mixer and shearer can also be used to produce the water infused baking soda and to distribute the baking soda clumps into the molds. Using a conveyer belt or other means of locomotion, mold bays can be fed through various stations. First, the mold trays can be run through a station that sprays mold release. Second, the mold trays can be run through a station that randomly distributes baking soda across a two-dimensional field. The mold trays can then be sent to an injection site to be filled with aggregate. Finally, the trays can be circulated through an autoclave or other drying means to cure the concrete. A controller, like a programmable logic controller, can be used to coordinate the entire process.

Figure 11:
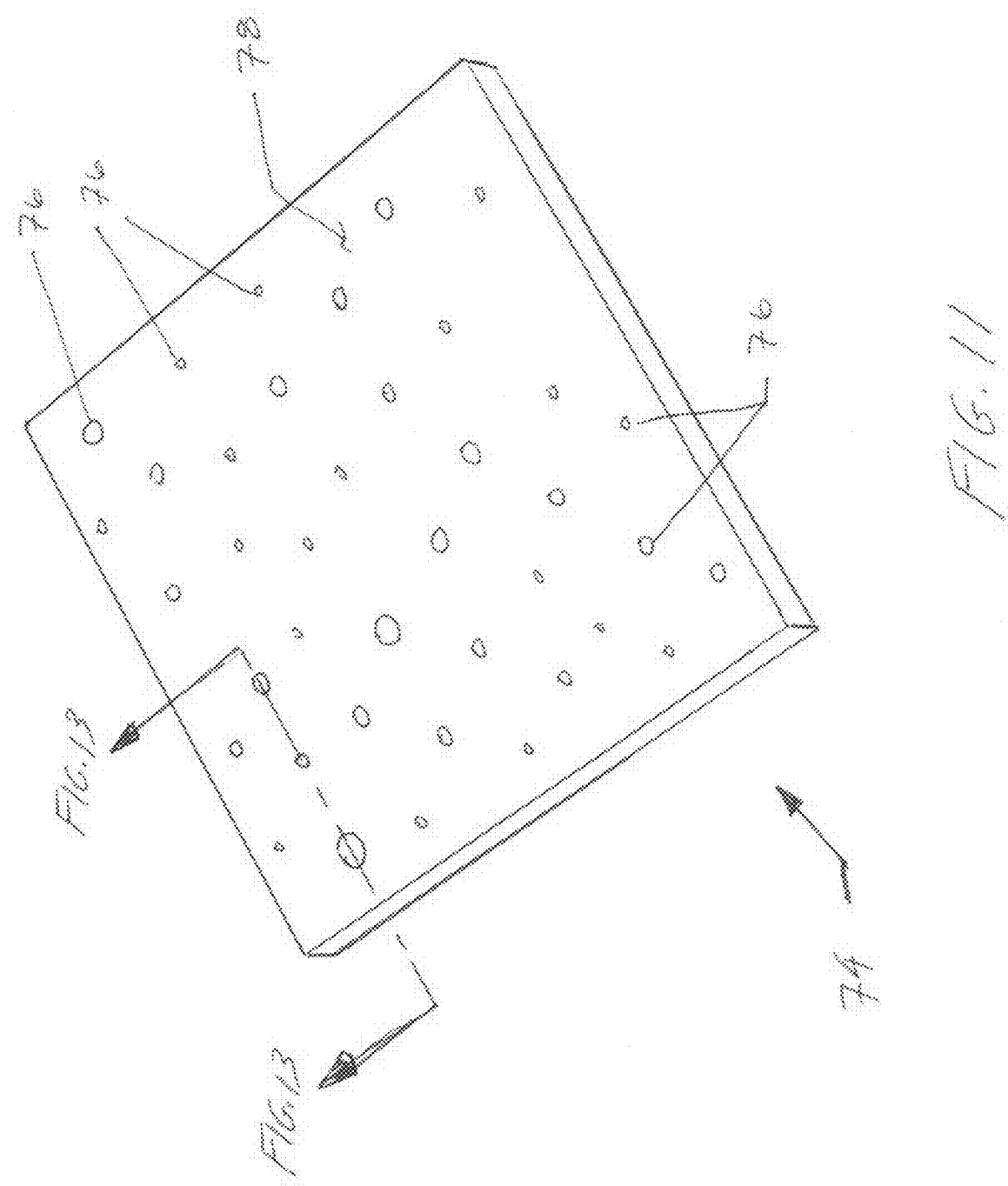
FIG. 11 is a perspective view, showing a mold used to make baking soda clumps.

A moderate level of automation can be used to create a more uniform distribution of clumps and clump sizes. FIGS. 11-16 illustrate a preferred embodiment of this enhancement. FIG. 11 shows flexible mold 74. The flexible mold is a sheet of highly flexible material—such as a molding silicone. The mold includes upper surface 78, which opens into a plurality of cavities 76. Cavities 76 are distributed across the upper surface in a variety of locations and sizes. Preferably the cavities encompass a wide range of sizes, such as a width of 2 mm to 10 mm.

Figure 12:
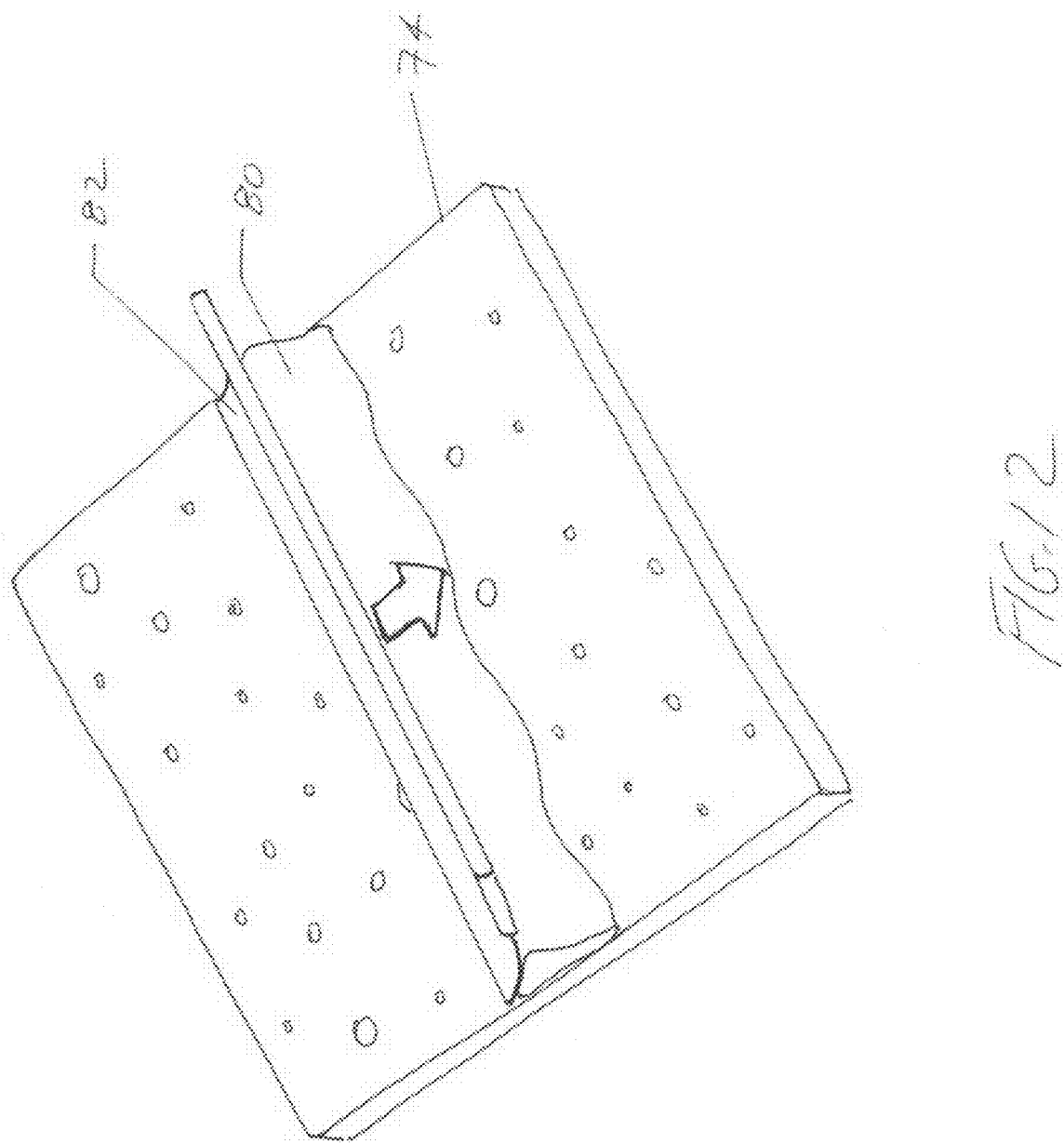
FIG. 12 is a perspective view, showing a squeegee being used to fill the cavities in the mold of FIG. 11.

A suitable paste mixture of water and baking soda is prepared as described previously. FIG. 12 shows the use of squeegee 82 to "wipe" a band of paste 80 across the face of the mold. This is depicted rather simplistically in FIG. 12. Ordinarily some surrounding barriers would encircle the mold to prevent the paste escaping. As those skilled in the art will realize, a conventional machine akin to a screen printing machine can be used for this task. The task may also be done manually. In any case, the result is that some of the baking soda paste fills each cavity in the flexible mold.

FIG. 13 shows a sectional elevation view through a portion of mold 74 (The location of the section is called out in FIG. 11). The reader will observe the variation in the size of the different cavities 76. FIG. 14 shows the same portion of the mold after the squeegee has been used to deposit baking soda paste in the cavities. Each cavity now contains a molded paste clump 84.

The paste clumps can be ejected from the mold using a variety of techniques. FIG. 15 illustrates the technique of inverting mold 74 over a suitable sheet 86. The mold is then flexed as shown. This flexure tends to open each of the cavities and allow the paste clump contained therein to drop free. The result is a collection of molded paste clumps 84 resting on sheet 86. These molded paste clumps assume roughly the same dimensions as the mold cavities used to make them.

Once the clumps are created they may be distributed randomly in the base of the concrete mold (as shown in FIGS. 3 and 8). FIG. 16 shows an elevation view of the molded paste clumps 84 resting on base 12 of the concrete mold. The reader will note that the shape of the molded paste clumps 84 shown in FIG. 16 is somewhat different from the shape of the hand made clumps shown in FIG. 8. However, the initial pouring of the concrete over the paste clumps will tend to round and flatten the clumps so that the sharp edges found immediately after the molding tend to disappear.

Although the preceding descriptions contain significant detail they should not be viewed as limiting the invention but rather as providing examples of the preferred embodiments of the invention. As one example, many types and shapes of molds can be used to produce the concrete tiles. Accordingly, the scope of the invention should be determined by the following claims, rather than the examples given.

Having described our invention, we claim:

1. A method of producing a concrete casting having a stone-mimicking surface, comprising:
   a. providing a concrete mold having a base, encircling side walls, and an open top;
   b. providing a mixed aggregate, including,
      i. sand,
      ii. cement,
      iii. coloring dye, and
      iv. water;
   c. providing a high-viscosity paste of water infused baking soda wherein said paste includes a specific volumetric baking soda to water ratio;
   d. providing a flexible paste clump mold having multiple cavities, wherein said flexible paste clump mold is made of a sheet of flexible material;
   e. squeegeeing said high-viscosity paste into said cavities within said flexible paste clump mold to create molded paste clumps;
   f. inverting said flexible paste clump mold and flexing said flexible paste clump mold to eject said molded paste clumps;
   g. randomly distributing said molded paste clumps on said base of said concrete mold;
   h. filling said concrete mold with said aggregate;
   i. allowing said aggregate to harden into a solid, thereby forming said casting; and
   j. removing said casting from said mold.

2. A method of producing a concrete casting as recited in claim 1, wherein said paste includes a volumetric baking soda to water ratio between about 2.5 to 1 and about 5.0 to 1.

3. A method of producing a concrete casting as recited in claim 1, wherein said high-viscosity paste comprises a volumetric baking soda to water ratio between 3.75 to 1 and 5 to 1.

4. A method of producing a concrete casting as recited in claim 3, wherein said high-viscosity paste comprises a volumetric baking soda to water ratio between 4.25 to 1 and 4.75 to 1.

5. A method of producing a concrete casting as recited in claim 1, further comprising removing said baking soda clumps from said completed casting.

6. A method of producing a concrete casting as recited in claim 1, further comprising coating said concrete mold with mold release prior to filling said mold with said aggregate.

7. A method of producing a concrete casting as recited in claim 1, wherein said coloring dye within said aggregate is an ochre color.

8. A method of producing a concrete casting as recited in claim 1, wherein after said casting is removed from said concrete mold, said surface of said casting which was formed by said mold base is coated with a sealer.

9. A method of producing a concrete casting as recited in claim 1, further comprising adjusting the alkalinity of the aggregate to control the amount of carbon dioxide gas produced around said baking soda clumps.

10. A method of producing a concrete casting as recited in claim 1, further comprising adjusting the volumetric baking powder to water ratio to create a desired size distribution of baking soda clumps.

* * * * *